April 26, 1932.   H. C. LORD   1,855,640
UNIVERSAL JOINT
Filed Feb. 17, 1927

INVENTOR.
Hugh C. Lord

Patented Apr. 26, 1932

1,855,640

UNITED STATES PATENT OFFICE

HUGH C. LORD, OF ERIE, PENNSYLVANIA

UNIVERSAL JOINT

Application filed February 17, 1927. Serial No. 168,957.

The invention is particularly directed to the improvement of universal joints utilizing rubber which through the distortion of the rubber accomplishes the joint movement. With universal joints having a very wide angular deflection giving to the rubber an extreme distortion it is desirable to reduce this distortion and this is accomplished in the present invention by forming the joint members of a plurality of rubber units dividing between them the distortion. Features of the invention will appear from the specification and claims.

A preferred embodiment of the invention is illustrated in the accompanying drawings as follows:—

Figure 1:
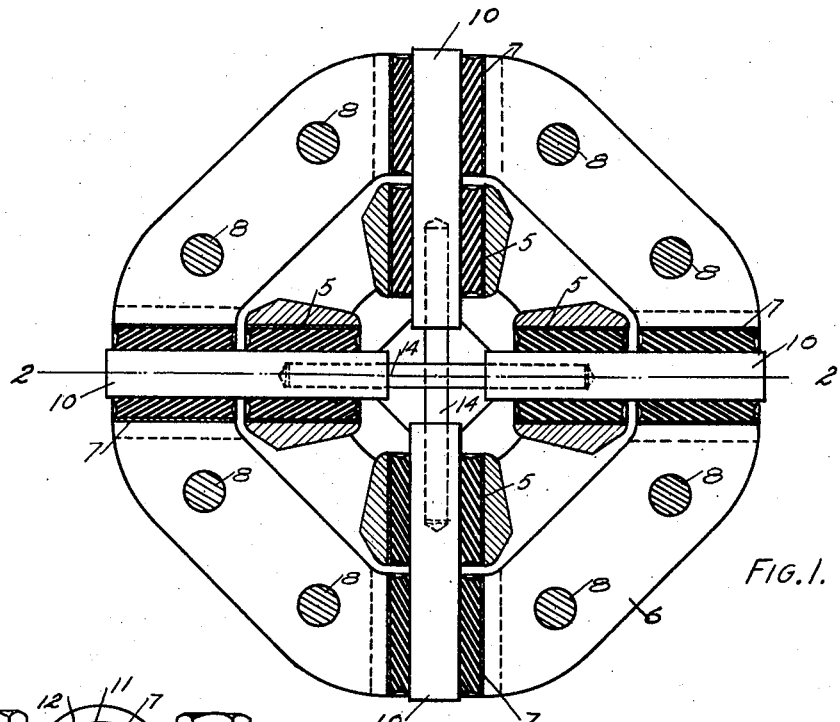
Figure 2:
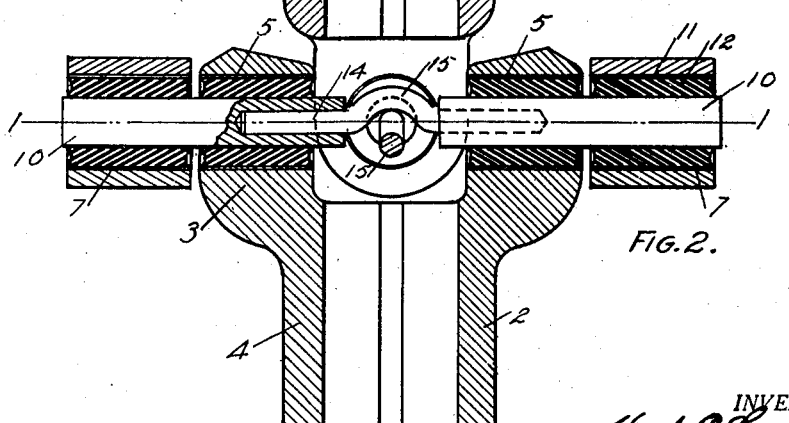

Fig. 1 shows a section on the line 1—1 in Fig. 2.

Fig. 2 a section on the line 2—2 in Fig. 1.

Figure 3:
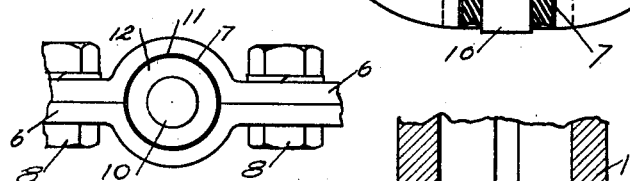

Fig. 3 an end elevation of one of the joint units and its immediate connections.

1 and 2 mark the shaft members of the joint. Forks 3 having the hubs or sleeves 4 extend from the shaft members 1 and 2. The forks are provided with sleeves 5 and the sleeves are arranged as is common on axes crossing at the focal center of the joint. In the particular type of universal joint shown a split ring 6 is arranged around the fork. This has the clamping sockets 7 and the parts of the ring are secured together by bolts 8. So far this is a common type of universal joint. Each joint member has a unit at each side of the axis and each of the units comprises an inner element in the form of a pin 10, and outer elements which involve the annular walls of the socket 7 and sleeve 5, or preferably insertable shells 11. Rubber bushings 12 are arranged between the shells 11 and pin 10 and these bushings are locked with the pin and shells preferably by surface unions accomplished through bonding during vulcanization. With this structure as the joint swings a part of the joint movement is taken up by one of the rubber bushings and the part of the movement by its companion rubber bushing, the pin 10 floating in the movement and moving part of the distance of the moving member. Thus the distortion of the rubber of each bushing is half of the total joint movement.

With the short joints which are preferable with most universal joints by reason of the fact that it is desirable to conserve space there is a tendency under the driving thrust of the joint to force the pin 10 out of a radial line from the focal point of the joint, thus localizing the stress on the rubber. This may be very largely avoided by connecting the center pins 10 at opposite sides of the axis so that the inclination of the joint to the axis is resisted by a very much longer bearing. This is most conveniently accomplished by providing the inner ends of the pins with sockets and the connecting pin 14 is forced into the sockets of the opposing pins, the centers of the pins 14 being slightly off-set at 15 so that one pin 14 may clear at the focal center the crossing pin 14 of the cross joint.

What I claim as new is:—

1. In a universal joint, the combination of shaft members and cross joint members between the shaft members, each cross joint member comprising a unit at each side of the axes of the shaft members and having a plurality of axially alined rubber bushings and inner and outer elements with which the bushings are locked, the inner element of the joint member being common to all the bushings of the joint member and the inner element of one joint member being off-set at the focal center relatively to the inner element of the other cross member.

2. In a universal joint, the combination of shaft members having joint openings extending radially from a focal center; an intermediate member having joint receiving openings registering with the openings in the shaft member; and joint units arranged in companion openings, each unit comprising one rubber bushing in each joint receiving opening and a common central pin.

3. In a universal joint, the combination of shaft members having joint openings extending radially from a focal center; an intermediate member having joint receiving openings registering with the openings in the shaft member; and joint units arranged in companion openings, each unit comprising one rubber bushing in each joint receiving opening and a common central pin, the central pins of opposing units being connected.

4. A universal joint comprising shaft members; and joint members connecting the shaft members, said joint members having their axes at right angles to each other, each joint member comprising a unit having a plurality of axially alined rubber bushings and elements with which the inner and outer surfaces of the bushings are locked, one of the elements being common to two of the bushings and the elements radially opposing the common element being free to move relatively to each other and to the common element.

5. A universal joint comprising shaft members; and joint members connecting the shaft members, said joint members having their axes at right angles to each other, each joint member comprising a unit having a plurality of axially alined rubber bushings and elements with which the inner and outer surfaces of the bushings are locked by a surface union, one of the elements being common to two of the bushings and the elements radially opposing the common element being free to move relatively to each other and to the common element.

6. A universal joint comprising shaft members; and joint members connecting the shaft members, said joint members having their axes at right angles to each other, each joint member comprising a unit having a plurality of axially alined rubber bushings and elements with which the inner and outer surfaces of the bushings are locked, the inner element being common to two of the bushings and the elements radially opposing the common element being free to move relatively to each other and to the common element.

7. A universal joint comprising shaft members; and joint members connecting the shaft members, said joint members having their axes at right angles to each other, each joint member comprising a unit having a plurality of axially alined rubber bushings and elements with which the inner and outer surfaces of the bushings are locked, the inner element being common to two of the bushings and the outer elements radially opposing the inner element being free to move relatively to each other and to the common element.

8. A universal joint comprising shaft members; and joint members connecting the shaft members, said joint members having their axes at right angles to each other, each joint member comprising a unit having a plurality of axially alined rubber bushings and elements with which the inner and outer surfaces are locked by surface union, the inner element being common to two of the bushings and the outer elements radially opposing the inner element being free to move relatively to each other and to the common element.

9. A universal joint comprising shaft members; and joint members connecting the shaft members, said joint members having their axes at right angles to each other, each joint member comprising a unit having a plurality of axially alined rubber bushings and elements with which the inner and outer surfaces of the bushings are locked, one of the elements being common to the bushings at each side of the axes of the shafts and the elements radially opposed to the common element being free to move relatively to each other and to the common element.

10. A universal joint comprising shaft members; and joint members connecting the shaft members, said joint members having their axes at right angles to each other, each joint member comprising a unit having a plurality of axially alined bushings and elements at each side of the axes of the shafts with which the inner and outer surfaces of the bushings are locked, the inner element of the joint member being common to all the bushings of the joint member and the outer elements at each side of the shafts being free to move relatively to each other and to the inner element.

In testimony whereof I have hereunto set my hand.

HUGH C. LORD.